United States Patent
Cho

(10) Patent No.: US 7,499,237 B2
(45) Date of Patent: Mar. 3, 2009

(54) RECORDING CONTROLLING METHOD IN HARD DISK DRIVE AND HARD DISK DRIVE USING THE SAME

(75) Inventor: Jae-deog Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 104 days.

(21) Appl. No.: 11/482,037

(22) Filed: Jul. 7, 2006

(65) Prior Publication Data

US 2007/0019320 A1    Jan. 25, 2007

(30) Foreign Application Priority Data

Jul. 19, 2005    (KR)    ........................ 10-2005-0065416

(51) Int. Cl.
*G11B 21/02*    (2006.01)
*G11B 5/09*    (2006.01)
*G11B 5/596*    (2006.01)

(52) U.S. Cl. .................... 360/75; 360/51; 360/78.04

(58) Field of Classification Search ................ None
See application file for complete search history.

(56) References Cited

U.S. PATENT DOCUMENTS 6,724,553 B2 * 4/2004 Yun et al. ................. 360/51
6,873,488 B2 * 3/2005 Teo et al. ................. 360/77.06
7,006,322 B2 * 2/2006 Sado ........................ 360/75
7,349,171 B2 * 3/2008 Rutherford et al. ....... 360/75

FOREIGN PATENT DOCUMENTS

| JP | 2003-151101 | 5/2003 |
| JP | 2003-249044 | 9/2003 |
| KR | 10-2003-0038303 | 5/2003 |
| KR | 10-2004-0086132 | 8/2004 |
| KR | 2004-0086132 | 10/2004 |

* cited by examiner

*Primary Examiner*—K. Wong
(74) *Attorney, Agent, or Firm*—Staas & Halsey LLP

(57) ABSTRACT

A method of controlling recording and a hard disk drive (HDD) using the same. The HDD has heads in which a write head and a read head are spaced apart from each other by a predetermined gap in a track direction, and the method includes: reading a table having a head gap time corresponding to the gap between the write head and the read head and a disk linear velocity; and beginning a write operation by delaying the write operation by the head gap time from a data sector pulse. Accordingly, since a gap between a servo sector and a data sector and between data sectors can be reduced by the length corresponding to a head gap time, the usage efficiency of a data area can be increased.

11 Claims, 8 Drawing Sheets

DATA SECTOR PULSE

RECORDING CONTROLLING METHOD IN HARD DISK DRIVE AND HARD DISK DRIVE USING THE SAME

CROSS-REFERENCE TO RELATED APPLICATION

This application claims the benefit of Korean Patent Application No. 10-2005-0065416, filed on Jul. 19, 2005, in the Korean Intellectual Property Office, the disclosure of which is incorporated herein by reference.

BACKGROUND OF THE INVENTION

1. Field of the Invention

The present invention relates to a method of controlling recording in a hard disk drive (HDD), and more particularly, to a method of compensating for an error in a recording start position to prevent a head gap and an HDD using the same.

2. Description of Related Art

A hard disk drive (HDD) includes a plurality of magnetic heads combined with rotating disks. A head writes and reads data by magnetizing a disk surface and sensing a magnetic field. The magnetic head having a write component for magnetizing a disk and a separate read component for sensing a magnetic field of the disk has been developed. The read component is typically made of a magneto-resistive (MR) material. The resistance of the MR material changes according to a magnetic field of a disk. A head having an MR read component is generally called an MR head.

The head is generally attached to a curved arm combined with a sub-assembly called a head gimbal assembly (HGA). The HGA is combined with an actuator arm. The actuator arm includes a voice coil motor (VCM) for moving the head across a disk surface.

Information is typically stored in concentric tracks formed across each disk surface. Each track is typically divided into segments. The VCM and the actuator arm move the head from one track of the disk to another.

It is preferable that the head be maintained on the center of each track to exactly write and read data. Servo sectors include servo bursts located opposite to each other on the centerline of the track to control a position of the head. Signals generated due to the servo bursts cause a position error signal (PES) that affects a position of the head on the centerline of each track.

FIG. 1 illustrates a format of data recorded on tracks of an HDD. Referring to FIG. 1, each track includes a servo sector 102 and a data sector 104. Servo sectors 102 exist on straight lines in the radius direction of a disk and are apart from each other by equal angles in the circumference direction of the disk. One or more data sectors 104 exist between adjacent servo sectors 102. Each data sector 104 contains a fixed number of bits, and a servo sector 102 may be placed by dividing a data sector 104.

A predetermined distance (a guide gap) 106 exists between a servo sector 102 and a data sector 104 and between data sectors 104. The guide gap 106 prevents servo sectors 102 and data sectors 104 from being erased by a write head and is set by considering a distance between the write head and a read head and a minimum linear velocity on the disk.

The beginning of a servo sector 102 is detected using a servo address mark recorded in the servo sector 102. A data sector pulse is used to notify the beginning of a data sector 104. As illustrated in FIG. 1, the data sector pulse is generated by a read/write channel circuit (generally a channel chip), at every fixed time interval based on the servo address mark, i.e., at every interval comprising a data sector 104 from a position delayed by the guide gap 106 from the ending of a servo sector 102. The data sector pulse timing for generating the data sector pulse is different according to zones and is registered in a zone map table.

Thus, the HDD performs an operation of writing or reading data to or from a data sector 104 based on the data sector pulse.

In the HDD, MR heads including an inductive write head and a read head made of an MR material are used. The write head and the read head are apart from each other by a predetermined gap in the disk track direction and also may have an offset in the disk radius direction.

FIGS. 2A and 2B illustrate different magnetic recording heads. In a magnetic recording head illustrated in FIG. 2A, a write head and a read head are apart from each other by a gap L in the disk track direction and have an offset in the disk radius direction. In a magnetic recording head illustrated in FIG. 2B, a write head and a read head are apart from each other by the gap L in the disk track direction.

In the HDD, a disk is rotated with a constant angular velocity, e.g., 7,200 rpm, by a spindle motor. Accordingly, a linear velocity varies according to a position on the disk.

Thus, influences by the gap between the write head and the read head vary according to a position on the disk. That is, since the linear velocity is faster in the outer circumference of the disk than in the inner circumference, a head gap time is shorter in the outer circumference of the disk than in the inner circumference. Here, the head gap time is the time required to move the head by the head gap.

FIG. 3 schematically illustrates influences of a head gap and a linear velocity in a write operation of an HDD. Referring to FIG. 3, the linear velocity is faster in the outer circumference of a disk than in the inner circumference, and therefore, a head gap time is shorter in the outer circumference of the disk than the inner circumference (T_od<T_id).

Conventionally, in considering the head gap, the servo sector and the data sector, the data sectors are arranged being apart from each other by a gap corresponding the head gap timing that is, a distance considering the minimum linear velocity (a guide gap).

However, the guide gap decreases the usage efficiency of a data area and increases the length of a data preamble because an unnecessary write operation is performed between a servo sector and a data sector.

FIGS. 4(A) through 4(K) are waveform diagrams for illustrating a conventional method of controlling recording in an HDD. FIG. 4A illustrates a servo gate signal for representing a servo sector zone. FIG. 4B illustrates a head gap time (Td_WR_od), FIG. 4C illustrates a data sector pulse, FIG. 4D illustrates write gate timing, FIG. 4E illustrates a data recording area, and FIG. 4F illustrates read gate timing, in the outer circumference. FIG. 4G illustrates a head gap time (Td_WR_id), FIG. 4H illustrates a data sector pulse, FIG. 4I illustrates write gate timing, FIG. 4J illustrates a data recording area, and FIG. 4K illustrates read gate timing, in the inner circumference.

Referring to FIGS. 4(A) through 4(K), the data sector pulse is generated after a fixed time interval from the servo gate signal in the inner and outer circumferences, and a read operation and a write operation are performed by synchronizing with the data sector pulse.

To prevent a servo sector from being erased by the write operation performed in synchronization with the data sector pulse, the data sector pulse should be generated after a time interval of a from the servo gate signal. Accordingly, a gap corresponding to the time interval of a, i.e., a guide gap, must exist between a servo sector and a data sector and between data sectors.

As illustrated in FIGS. 4E and 4J, the write operation is unnecessarily performed between a servo sector and a data sector. In other words, an unnecessary write operation is performed in a guide gap. In the write operation, a data preamble is recorded until a data sector address mark is detected. Thus, according to the conventional method illustrated in FIG. 4, data preambles are unnecessarily recorded in data gaps.

Techniques for beginning a write operation from the start portion of a data sector by measuring a head gap time and using the measured time are disclosed in Korean patent publication No. 2004-86132 and Japanese patent publication Nos. 1994-176486, 1995-326032, and 2003-151101. However, since the head gap time is measured and compensated for (Japan patent publication Nos. 1994-176486 and 2003-151101 and Korea patent publication No. 2004-86132) or an offset and a skew angle are measured and compensated for (Japan patent publication No. 1995-326032) by recording a predetermined compensation pattern on a disk and reading this pattern through a read head, an extra head gap time measurement device is required or a processing time is longer.

In addition, since a guide gap considering a minimum linear velocity is set as described in FIG. 4, the data usage efficiency is low.

BRIEF SUMMARY

An aspect of the present invention provides a method of controlling recording of recording data with high density in an HDD by preventing effects of a gap between a write head and a read head.

An aspect of the present invention also provides an HDD using the above-described method.

According to an aspect of the present invention, there is provided a method of controlling recording in an HDD having heads in which a write head and a read head are spaced apart from each other by a predetermined gap in a track direction, for improving the usage efficiency of a data area by preventing effects of the gap between the write head and the read head, the method comprising: reading a table having a head gap time corresponding to the gap between the write head and the read head, and a disk linear velocity; and beginning a write operation after the head gap time from a data sector pulse.

The table may be a zone map table of the HDD.

The end portions of a data sector and a servo sector may be apart from each other by a distance corresponding to the head gap time.

According to another aspect of the present invention, there is provided a hard disk drive (HDD) comprising: a disk; a head recording information on the disk and reading information from the disk; a voice coil motor (VCM) driver driving a VCM to move the head across the surface of the disk; and a controller controlling the VCM driver to record data in a target servo sector through the head, wherein the controller controls the head to read a table having a head gap time corresponding to a gap between a write head and a read head and a disk linear velocity, and to begin a write operation by delaying the write operation by the head gap time from a data sector pulse.

According to another aspect of the present invention, there is provided a hard disk drive (HDD) including: a disk storing a zone map table including write data sector pulse timings each indicating a period from a data sector pulse to a recording start time in response to a head gap time, the head gap time based on a head gap and a velocity of a the disk; and a controller controlling the read/write head to read the table and to execute a write process at a target sector synchronized with a write data sector pulse corresponding to the target sector so that a start of the write process is delayed by the head gap time from the data sector pulse.

According to another aspect of the present invention, there is provided a method of preventing a head gap, including: reading a table having a head gap time corresponding to a gap between a write head and a read head of a read/write head, and a disk linear velocity; generating a write data sector pulse based on a data sector pulse timing and a write data sector pulse timing; and generating a write gate signal synchronized with the write data sector pulse so that a write operation beings after the head gap time from a data sector pulse has elapsed.

According to yet other aspects of the present invention, there are provided computer-readable-recording media encoded with processing instructions for causing a processor to execute the aforementioned methods.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
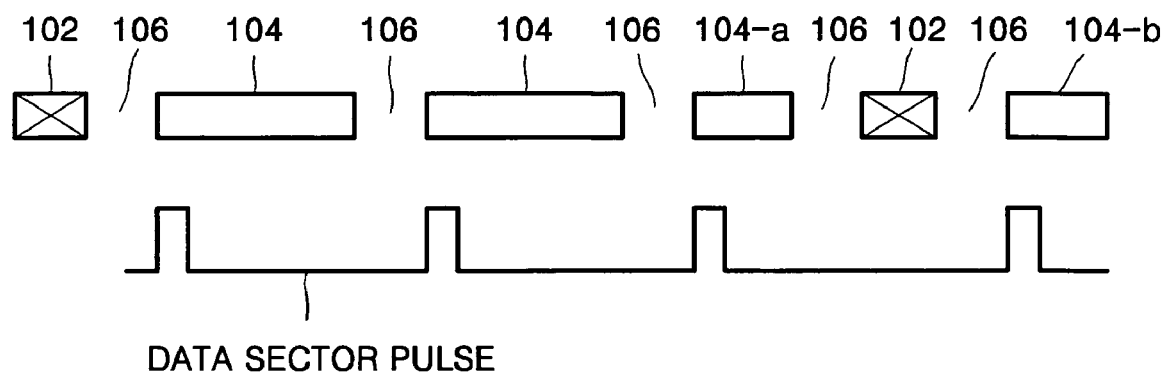
FIG. 1 illustrates a format of data recorded on tracks of an HDD.
Figure 2A:
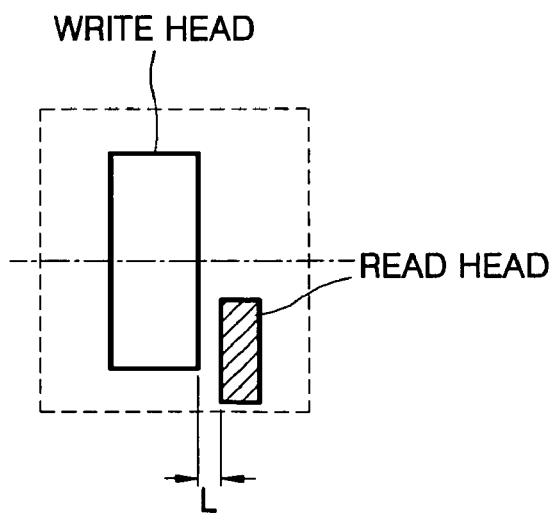
FIGS. 2A and 2B illustrate different magnetic recording heads.
Figure 2B:
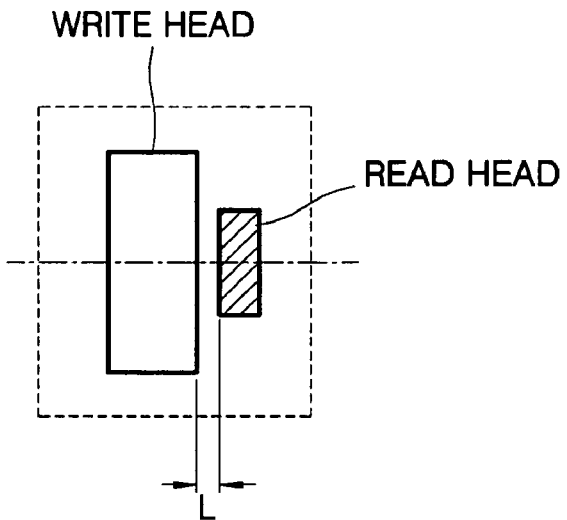
Figure 3:
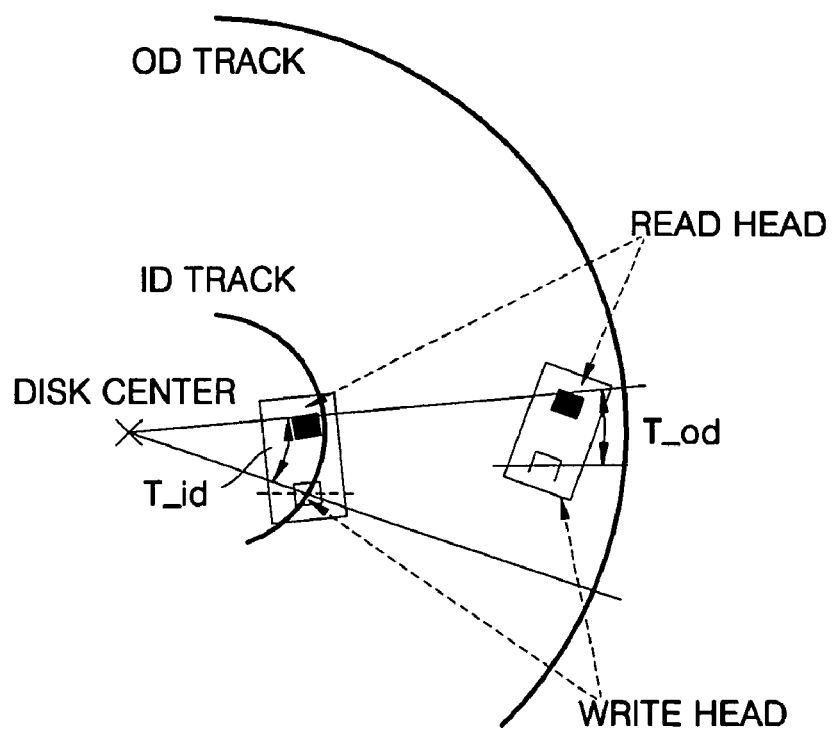
FIG. 3 schematically illustrates an effect of a head gap and a linear velocity in a write operation of an HDD.
Figure 4:
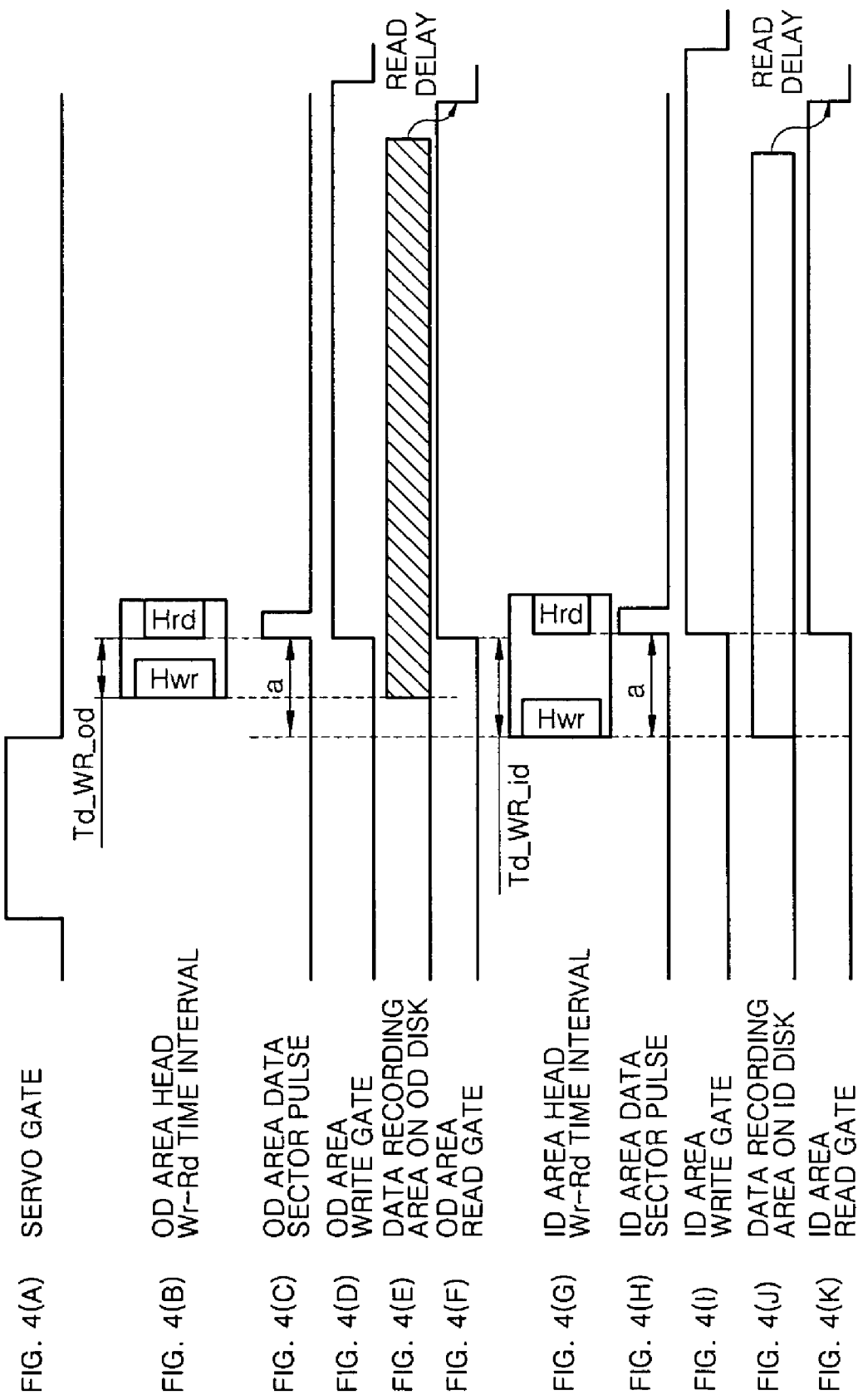
FIGS. 4 (A) through (K) are waveform diagrams for illustrating a conventional method of controlling recording.

Reference will now be made in detail to embodiments of the present invention, examples of which are illustrated in the accompanying drawings, wherein like reference numerals refer to the like elements throughout. The embodiments are described below in order to explain the present invention by referring to the figures.

Each head used in an HDD has a write head and a read head separated from each other by a constant gap. When data is recorded on a disk using the write head based on a position separating a distance corresponding to a predetermined delayed time from a servo sector while servo information is being read from the servo sector using the read head, a position at which the data starts to be recorded varies according to a head gap time. The head gap time is greater if a disk rotational speed is lower and the head is placed nearer the inner circumference of the disk.

In the embodiments of the present invention described hereafter, this head gap time according to a head position on a disk is calculated by a formula in which a designed gap between a write head and a read head and the head position on the disk are considered, and registered in a table. A zone map table having a data sector pulse timing and a write data sector pulse timing considering the head gap time is created using the table.

In each data zone, a write data sector pulse delayed by the write data sector pulse timing of a head from a data sector pulse is generated, and a write operation is performed based on the write data sector pulse. A read operation is performed based on the data sector pulse.

FIGS. 5(A) through (M) are waveform diagrams for illustrating a method of controlling recording in an HDD according to an embodiment of the present invention. FIGS. 5(A) through (M) illustrate an example in which a gap corresponding to the minimum head gap time exists between a servo sector and a data sector and between data sectors.

FIG. 5A illustrates a servo gate signal. FIG. 5B illustrates a head gap time (Td_WR_od), FIG. 5C a data sector pulse timing in read mode, FIG. 5D a write data sector pulse timing in write mode, FIG. 5E a write gate timing, FIG. 5F a data recording area, and FIG. 5G a read gate timing, in the outer circumference. FIG. 5H illustrates a head gap time (Td_WR_id), FIG. 5I a data sector pulse timing in read mode, FIG. 5J a write data sector pulse timing in write mode, FIG. 5K a write gate timing, FIG. 5L a data recording area, and FIG. 5M a read gate timing, in the inner circumference.

Figure 5:
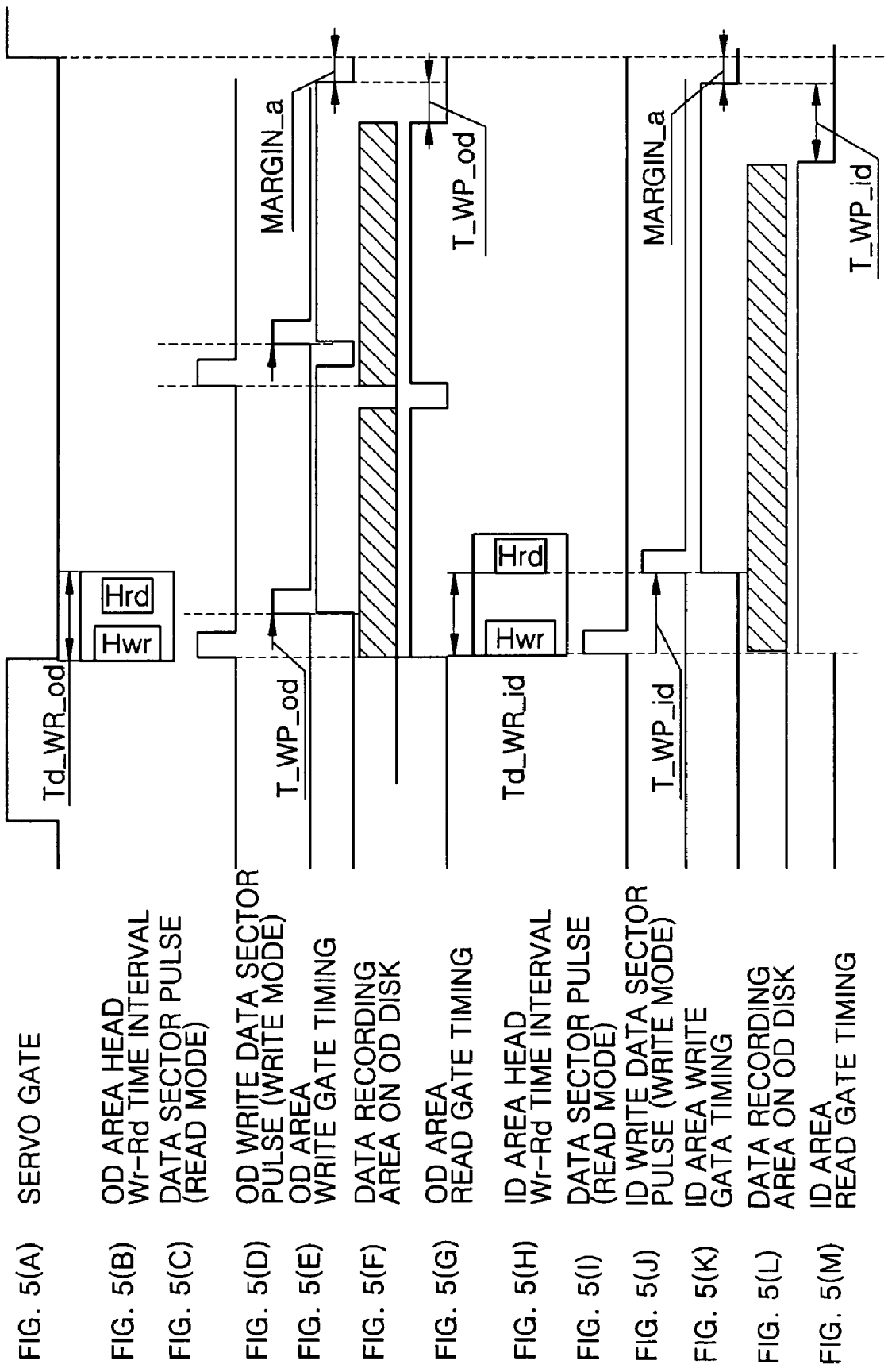
FIGS. 5 (A) though (M) are waveforms diagram for illustrating a method of controlling recording according to an embodiment of the present invention.

Referring to FIG. 5, in the method of controlling recording, a read operation is performed in synchronization with a data sector pulse, and a write operation is performed in synchronization with a write data sector pulse.

Write data sector pulse timings are registered in a zone map table in an HDD manufacturing process. A write data sector pulse timing T_WP corresponds to a head gap time Td_WR calculated by the following formula in which a disk linear velocity and a head gap are considered:

$$Td\_WR = T\_rev \times L\_gap / L\_rev \qquad (1).$$

Here, Td_WR denotes a head gap time, T_rev denotes one revolution time of a disk, L_gap denotes a gap between a write head and a read head, and L_rev denotes one revolution length. T_rev is determined by a nominal rotational speed of the disk, and L_rev is determined by a head position on the disk, i.e., a distance from the disk center to the head position. That is, L_rev varies according to a data zone. L_gap is a designed gap between the write head and the read head, and preferably a measurement value.

To prevent a servo sector from being erased by the write head, the write data sector pulse timing T_WP per zone is a time interval from when a read gate signal ends to when a servo gate signal begins. It is preferable that the trailing edge of a write gate signal does not overlap with a servo gate signal, i.e., a data sector does not overlap a servo sector, as illustrated in FIGS. 5(A) through (M). To do this, a data sector format must be designed such that the write data sector pulse timing T_WP and a timing margin Margin_a exist between the end portion of a data sector and the start portion of a servo sector.

Figure 6:
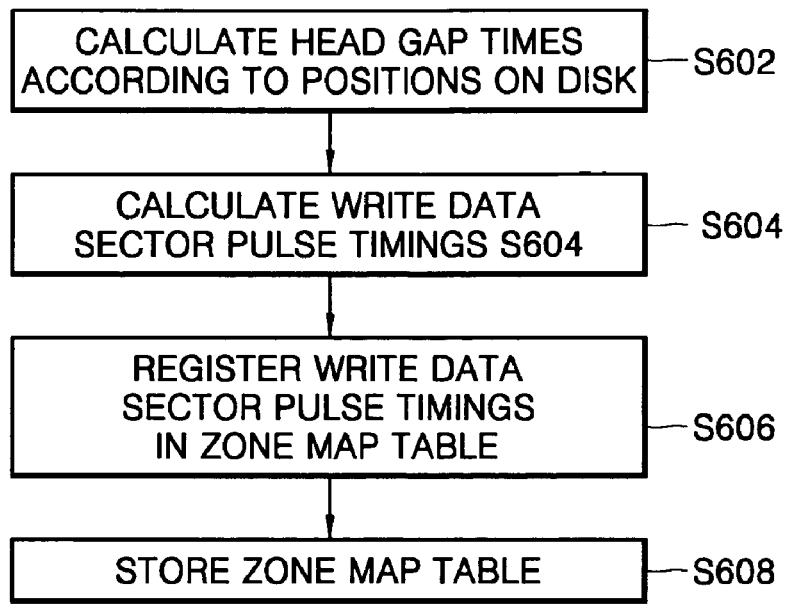
FIG. 6 is a flowchart of a zone map creating method in a method of controlling recording according to an embodiment of the present invention.

FIG. 6 is a flowchart of a zone map creating method in a method of controlling recording according to an embodiment of the present invention. Operations illustrated in FIG. 6 are performed in an HDD manufacturing process, and in more detail, in a zone map setting process.

Referring to FIG. 6, in operation S602, head gap times Td_WRs according to positions on a disk are calculated using Formula 1. The number of the head gap times Td_WRs is equal to the number of data zones. A table having the head gap times Td_WRs calculated in operation S602 is created.

In operation S604, a write data sector pulse timing according to a head position on the disk is calculated using the table created in operation S602. Since a disk linear velocity is faster in the outer circumference than in the inner circumference, a time interval between a write head and a read head is shorter in the outer circumference than in the inner circumference. Thus, the write data sector pulse timing is set to T_WP_od as illustrated in FIGS. 5(A) through (M). Since the disk linear velocity is slower in the inner circumference than in the outer circumference, the time interval between a write head and a read head is longer in the inner circumference than in the outer circumference. Thus, the write data sector pulse timing is set to T_WP_id as illustrated in FIGS. 5(A) through (M).

In operation S606, a zone map table including the write data sector pulse timings T_WP is created. The zone map table contains the number of data zones, track density of each zone, the number of sectors per track, a data transmission rate, a data sector pulse timing, and the write data sector pulse timings T_WP according to an embodiment of the present invention.

In operation S608, the zone map table created in operation S606 is stored in a system area of the disk, i.e., a maintenance cylinder or a nonvolatile memory.

Figure 7:
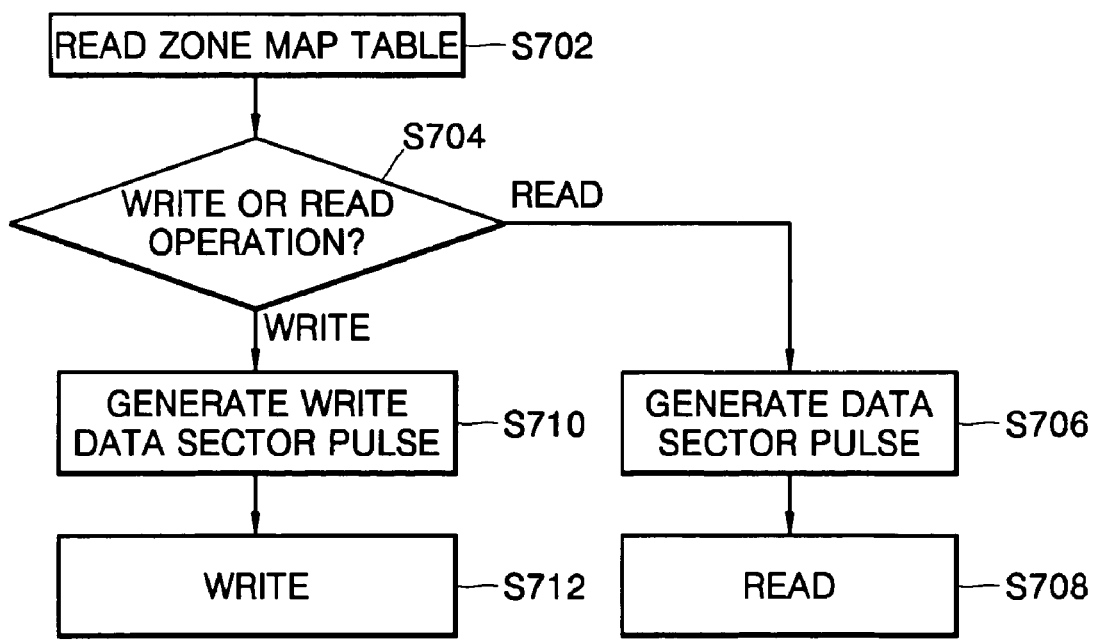
FIG. 7 is a flowchart of a method of controlling recording according to an embodiment of the present invention.

FIG. 7 is a flowchart of a method of controlling recording according to an embodiment of the present invention.

Referring to FIG. 7, in operation S702, a zone map table recorded in a cylinder area of a disk is read.

In operation S704, whether to perform a write operation or a read operation is determined.

When a read operation is performed, in operation S706, a data sector pulse is generated by referring to a data sector pulse timing registered in the zone map table.

In operation S708, the read operation begins by generating a read gate signal in synchronization with the data sector pulse. A channel chip begins an operation of decoding a read signal in response to the read gate signal.

When a write operation is performed, in operation S710, a write data sector pulse is generated by referring to the data sector pulse timing and a write data sector pulse timing registered in the zone map table.

In operation S712, the write operation begins by generating a write gate signal in synchronization with the write data sector pulse. The channel chip begins an operation of encoding write data in response to the write gate signal.

According to the present embodiment, a write data sector pulse delayed by a write data sector pulse timing, i.e., a head gap time, from a data sector pulse is generated in a write operation. Thus, since the start portion of a data sector can be matched with the start timing of the write operation, the length of a guide gap can be optimized, thereby increasing the usage efficiency of a data area.

Figure 8:
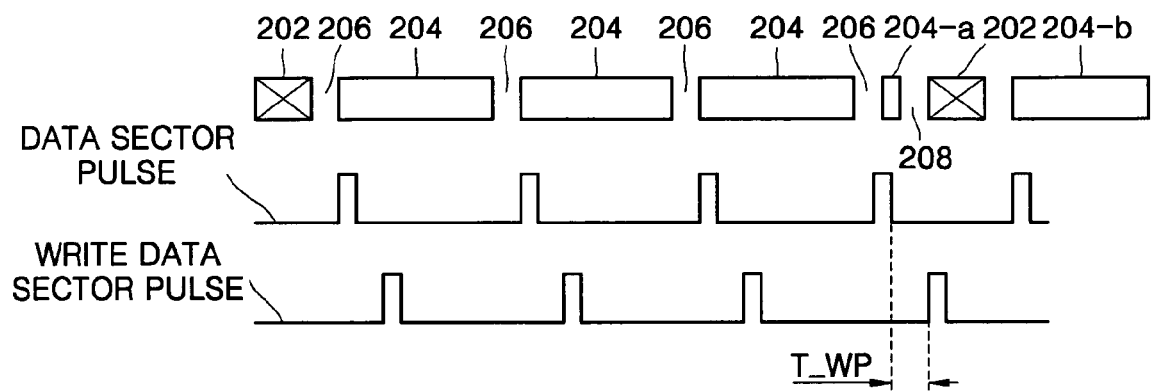
FIG. 8 illustrates a data format in a method of controlling recording according to an embodiment of the present invention.

FIG. 8 illustrates a data format in a method of controlling recording according to an embodiment of the present invention. Compared with FIG. 1, the length of a guide gap 208 is optimized. This is because a guide gap 206 between a servo sector 202 and a data sector 204 and between data sectors 204 can be reduced to the length corresponding to the minimum head gap time in the present embodiment while the guide gap 106 between a servo sector 102 and a data sector 104 and between data sectors 104 corresponds to the maximum head gap time in the conventional recording control method illustrated in FIG. 1. FIG. 8 shows an example in which the guide gap 206 between a servo sector 202 and a data sector 204 and between data sectors 204 is reduced to the length corresponding to the minimum head gap time.

In addition, since a position of a data sector pulse can be matched with the start portion of a recorded data area in the present invention, a preamble section of the data area can be reduced.

Conventional head gap compensation is achieved by recording a specific pattern on a disk in a burn-in test process, determining a time interval between a write starting point and a position read in a write operation, and using the time interval as head gap information. In addition, head gaps of all tracks are estimated using a result obtained by measuring head gaps in some tracks of the inner, the intermediate, and the outer circumferences of the disk.

Compared to this, in the present embodiment, write data sector pulse timings are registered in a zone map table as one kind of parameters by calculating them for data zones considering a disk linear velocity and a designed head gap without recording a specific pattern on a disk or reading it form the disk. Thus, the processing time of an HDD can be reduced.

Figure 9:
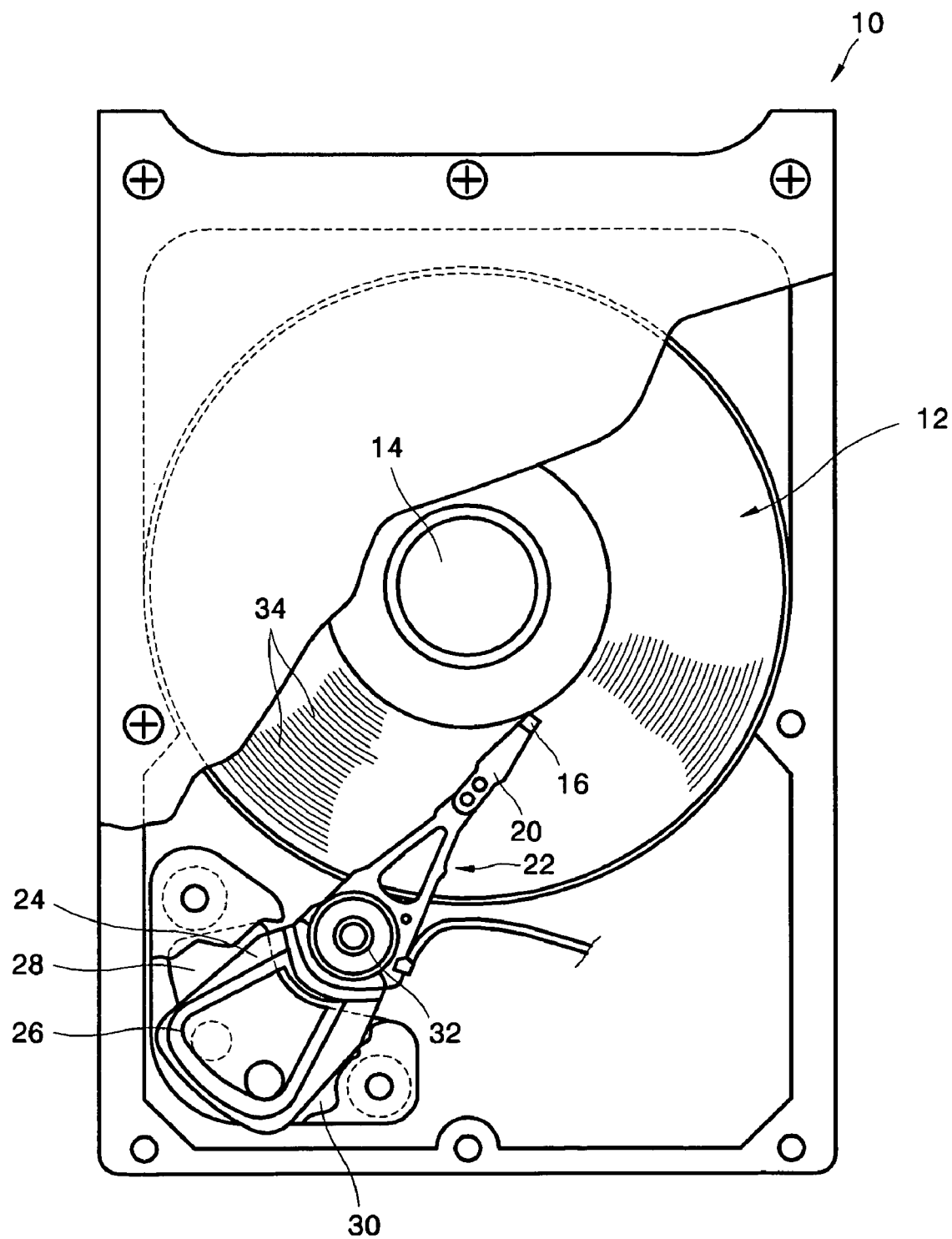
FIG. 9 is a schematic plan view of an HDD according to an embodiment of the present invention.

FIG. 9 is a schematic plan view of an HDD 10 according to an embodiment of the present invention. Referring to FIG. 9, the HDD 10 includes at least one magnetic disk 12 rotated by a spindle motor 14. The HDD 10 also includes a head 16 adjacently located to the surface of the disk 12.

The head 16 can read or write information from or on the rotating disk 12 by sensing a magnetic field formed on the disk 12 or magnetizing the disk 12. Typically, the head 16 is combined on each disk surface. Though a single head 16 is shown in FIG. 9, the head 16 includes a write head for magnetizing the disk 12 and a separated read head for sensing a magnetic field of the disk 12. Typically, the write head is composed of a magnetic circuit having a gap, and the read head is composed of a magneto-resistive (MR) component.

The head 16 can be combined with a slider 20. The slider 20 generates an air bearing between the head 16 and the surface of the disk 12. The slider 20 is combined with a head gimbal assembly (HGA) 22. The HGA 22 is attached to an actuator arm 24 having a voice coil 26. The voice coil 26 is located adjacently to a magnetic assembly 28 specifying a voice coil motor (VCM) 30. A current supplied to the voice coil 26 generates a torque which rotates the actuator arm 24 around a bearing assembly 32. The rotation of the actuator arm 24 moves the head 16 across the surface of the disk 12.

Information is typically stored in concentric tracks of the disk 12. In general, each track 34 includes a plurality of sectors. Each sector includes a data field and an identification field (a servo field). The identification field is composed of a gray code for identifying sectors and tracks (cylinders) and burst signals for detecting a degree of mismatching the head 16 with the track center. The head 16 moves across the surface of the disk 12 by a motion of the actuator arm 24.

Figure 10:
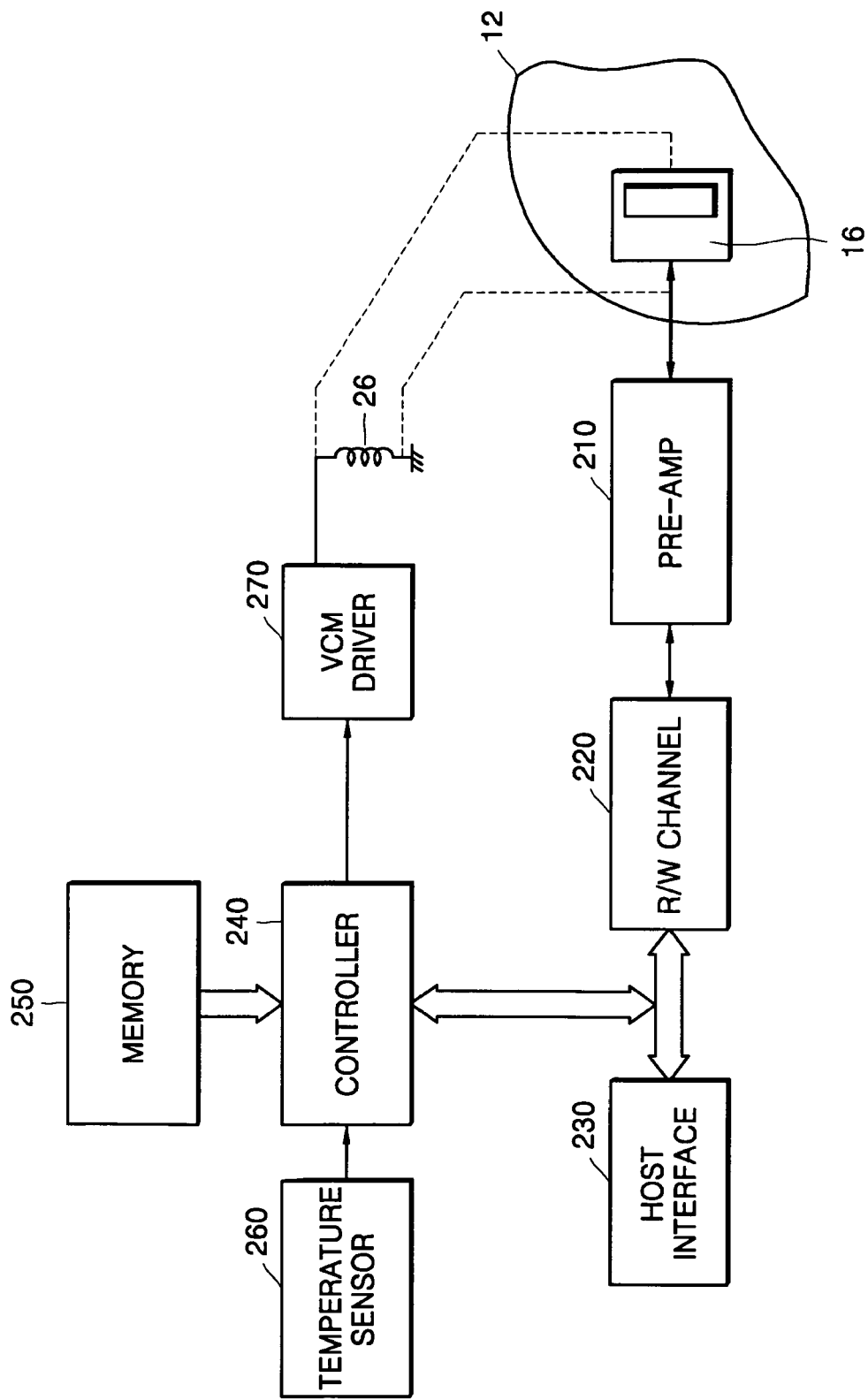
FIG. 10 is a block diagram of an electrical circuit of an HDD according to an embodiment of the present invention.

FIG. 10 is a block diagram of an electrical circuit of an HDD according to an embodiment of the present invention. Referring to FIG. 10, the HDD includes a disk 12, a head 16, a pre-amplifier 210, a write/read (R/W) channel 220, a host interface 230, a controller 240, a memory 250, a temperature sensor 260 and a VCM driver 270.

A circuit including the pre-amplifier 210 and the write/read channel 220 is called a write/read circuit.

Various programs and data to control the HDD and, in particular, a zone map table according to an embodiment of the present invention, are stored in the memory 250. The memory 250 is a nonvolatile memory.

The controller 240 can be a digital signal processor (DSP), a microprocessor, or a micro-controller. The controller 240 provides a control signal to the R/W channel 220 to read information from the disk 12 or write information on the disk 12. Information is typically transmitted from the R/W channel 220 to the host interface 230. The host interface 230 includes a buffer memory and a control circuit for interfacing the HDD with a system such as a personal computer (PC).

The controller 240 is combined with the VCM driver 270 supplying a driving current to a voice coil 26. The controller 240 supplies a control signal to the VCM driver 270 to control activation of a VCM and a motion of the head 16.

The controller 240 is connected to the nonvolatile memory 250 such as a flash memory. The memory 250 stores therein commands and data used by the controller 240 to execute software routines. The software routines include a seek routine for moving the head 16 from one track to another. The seek routine includes a servo control routine to guarantee that the head 16 is moved to an exact position on a track.

In a data read mode, the HDD amplifies an electrical signal sensed by the head 16 from the disk 12 so as to ease signal processing in the pre-amplifier 210. The R/W channel 220 encodes the amplified analog signal into a digital signal readable by a host device (not shown), converts the digital signal to a data stream, and transmits the stream data to the host device through the host interface 230. Here, the controller 240 generates a data sector pulse and a read gate signal by referring to the zone map table, and the R/W channel 220 decodes data read in response to the read gate signal.

In a data write mode, the HDD receives data from the host device, temporarily stores the received data in a buffer (not shown) included in the host interface 230, converts the data stored in the buffer to a binary data stream suitable for a write channel using the R/W channel 220 by sequentially outputting the data stored in the buffer, and records the binary data stream on the disk 12 through the head 16 using a write current amplified by the pre-amplifier 210. Here, the controller 240 generates a write data sector pulse and a write gate signal by referring to the zone map table, and the R/W channel 220 encodes data read in response to the write gate signal and provides the encoded data to a write head.

Embodiments of the present invention can be realized as a method, an apparatus, a computer-readable recording medium, and/or a system. When the present invention is realized as software, components of the present invention are embodied as code segments for executing required operations. A program or the code segments can be stored in a processor readable recording medium and transmitted as computer data signals combined with a carrier using a transmission medium or a communication network. The processor readable recording medium is any data storage device that can store or transmit data which can be thereafter read by a computer system. Examples of the processor readable recording medium include electronic circuits, semiconductor memory devices, read-only memory (ROM), flash memory, erasable ROM, floppy disks, optical discs, hard discs, optical fiber media, and RF networks. The computer data signals include any signal which can be propagated via transmission media such as electronic network channels, optical fibers, air, electronic fields, RF networks.

Embodiments of the present invention can be applied to various kinds of disk drives including HDDs and various kinds of data storage devices.

In a method of controlling recording of an HDD according to the above-described embodiments of the present invention, since a gap between a servo sector and a data sector and between data sectors can be reduced by the length corresponding to a head gap time, the usage efficiency of a data area can be increased.

In addition, since a data sector pulse can be matched with a data recording start position, a data preamble section of a data sector can be reduced.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of controlling recording in a hard disk drive (HDD) having a head in which a write head and a read head are spaced apart from each other by a predetermined gap in a track direction, the method comprising:
    reading a table having a head gap time corresponding to the gap between the write head and the read head, and a disk linear velocity; and
    beginning a write operation after the head gap time from a data sector pulse has elapsed.

2. The method of claim 1, wherein the table is a zone map table of the HDD.

3. The method of claim 1, wherein the end portion of a data sector and a servo sector are spaced apart from each other by a distance corresponding to the head gap time.

4. The method of claim 2, wherein the zone map table is created by:
    calculating a head gap time considering a head gap and a disk linear velocity;
    calculating a write data sector pulse timing indicating a period from a data sector pulse to a recording start time in response to the head gap time; and
    registering the write data sector pulse timing in the zone map table.

5. The method of claim 4, wherein the calculation of the head gap time and the write data sector pulse timing is performed in a zone map setting process of the HDD.

6. A hard disk drive (HDD) comprising:
    a disk;
    a head recording information on the disk and reading information from the disk;
    a voice coil motor (VCM) driver driving a VCM moving the head across the surface of the disk; and
    a controller controlling the VCM driver to cause a head to record data in a target servo sector,
    wherein the controller controls the head to read a table having a head gap time corresponding to a gap between a write head and a read head and a disk linear velocity, and to begin a write operation by delaying the write operation by the head gap time from a data sector pulse.

7. The HDD of claim 6, wherein the table is a zone map table.

8. A hard disk drive (HDD) comprising:
    a disk storing a zone map table including write data sector pulse timings each indicating a period from a data sector pulse to a recording start time in response to a head gap time, the head gap time based on a head gap and a velocity of a the disk; and
    a controller controlling a read/write head to read the table and to execute a write process at a target sector synchronized with a write data sector pulse corresponding to the target sector so that a start of the write process is delayed by the head gap time from the data sector pulse.

9. A method of preventing a head gap, comprising:
    reading a table having a head gap time corresponding to a gap between a write head and a read head of a read/write head, and a disk linear velocity;
    generating a write data sector pulse based on a data sector pulse timing and a write data sector pulse timing; and
    generating a write gate signal synchronized with the write data sector pulse so that a write operation beings after the head gap time from a data sector pulse has elapsed.

10. A computer-readable recording medium encoded with processing instructions for causing a processor to execute a method of controlling recording in a hard disk drive (HDD) having a head in which a write head and a read head are spaced apart from each other by a predetermined gap in a track direction, the method comprising:
    reading a table having a head gap time corresponding to the gap between the write head and the read head, and a disk linear velocity; and
    beginning a write operation after the head gap time from a data sector pulse has elapsed.

11. A computer-readable recording medium, encoded with processing instructions for causing a processor to execute a method of preventing a head gap, comprising:
    reading a table having a head gap time corresponding to a gap between a write head and a read head of a read/write head, and a disk linear velocity; and
    generating a write data sector pulse based on a data sector pulse timing and a write data sector pulse timing;
    generating a write gate signal synchronized with the write data sector pulse so that a write operation beings after the head gap time from a data sector pulse has elapsed.

* * * * *

UNITED STATES PATENT AND TRADEMARK OFFICE
CERTIFICATE OF CORRECTION

PATENT NO.        : 7,499,237 B2
APPLICATION NO.   : 11/482037
DATED             : March 3, 2009
INVENTOR(S)       : Jae-deog Cho It is certified that error appears in the above-identified patent and that said Letters Patent is hereby corrected as shown below:

Column 10, Line 39, change "medium," to --medium--.

Signed and Sealed this

Nineteenth Day of May, 2009

JOHN DOLL
*Acting Director of the United States Patent and Trademark Office*